Aug. 8, 1950     H. K. ELLIOTT ET AL     2,517,855
ADJUSTABLE GRASS DISPENSER AND MULCHER
Filed Oct. 16, 1948     2 Sheets-Sheet 1
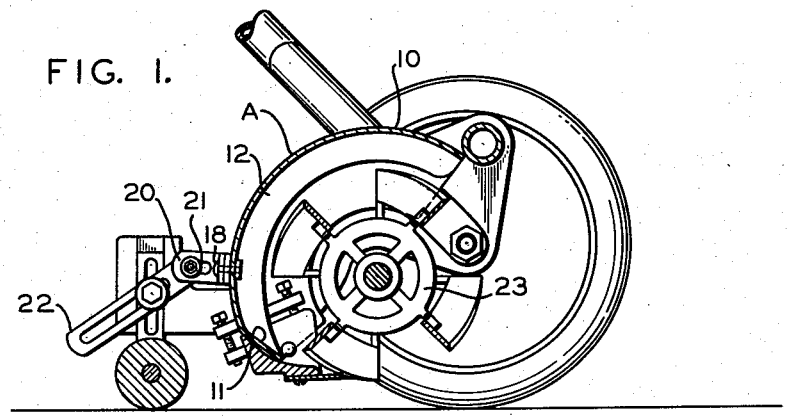
FIG. 1.
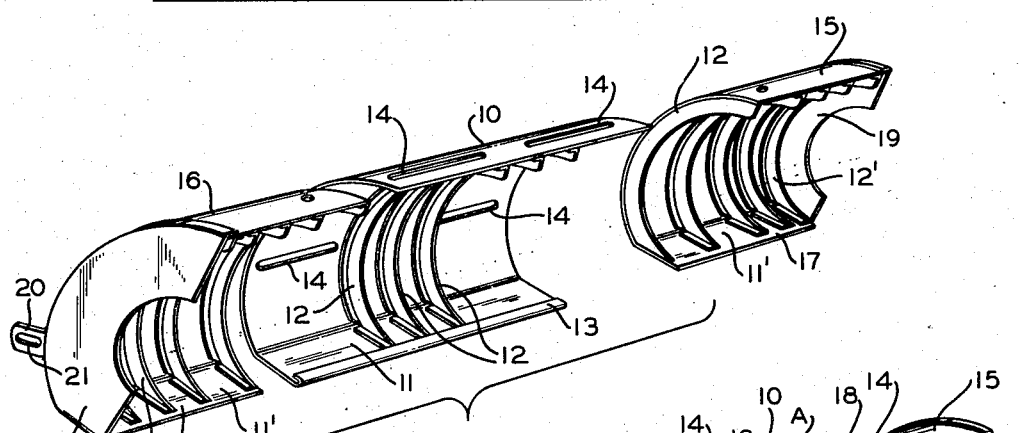
FIG. 2.
FIG. 3.
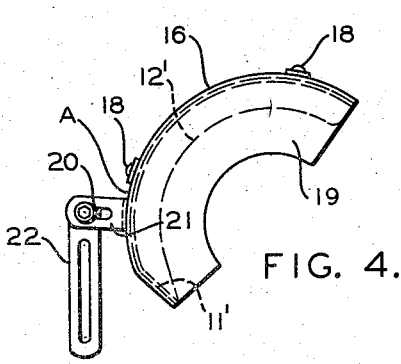
FIG. 4.
Inventor
HAROLD K. ELLIOTT
THELLAR J. JOHNSTON
By Howard Fischer
Attorney Aug. 8, 1950   H. K. ELLIOTT ET AL   2,517,855
ADJUSTABLE GRASS DISPENSER AND MULCHER
Filed Oct. 16, 1948   2 Sheets-Sheet 2

Inventor
HAROLD K. ELLIOTT
THELLAR J. JOHNSTON
By Howard Fincher
Attorney

Patented Aug. 8, 1950

2,517,855

UNITED STATES PATENT OFFICE 2,517,855

ADJUSTABLE GRASS DISPENSER AND MULCHER

Harold K. Elliott and Thellar J. Johnston, St. Paul, Minn.

Application October 16, 1948, Serial No. 54,926

8 Claims. (Cl. 56—249)

This invention is for a mulcher which is adapted to be attached to lawn mowers so as to carry the cut grass from the cutting blade up and over the same and into the path of the blade and thereby cut the grass into such fine particles that it is finally discharged in front of the blade onto the ground where it acts as a mulch to the grass.

A feature resides in providing an adjustable mulcher for lawn mowers which is adapted to be extended on either end to accommodate the different length mowers and thus take the place of separate mulchers for each different size lawn mower cutting blade. In this manner we can provide one lawn mulcher having adjustable means to fit readily upon the various size standard mowers.

Applicant has filed application Serial No. 698,840 with a filing date of September 23, 1946.

A further feature resides in providing a lawn mulcher wherein the baffles of the mulcher are perpendicular on the central portion whereas on the end portions the baffles extend at an angle toward the center at the top. The angle of the baffles on the end members is such that the baffles converge toward the center of the central member. This takes care of right or left helical cutter blades on lawn mowers. In this manner we do not have to provide a separate mulcher for either right or left hand helical cutters for the different types of mowers.

We provide end slit adjustment slots in the center portion of the mulcher which normally is positioned centrally of the cutting blade while the adjustable end portions are moved toward or away from the central portion to adjust the lawn mulcher to fit the length of the mower to which it is attached. Thus the central portion of the mulcher is fixed in relation to the center of the blades while the end members are moved or slid into position so as to cover the ends of the cutter blade of the mower and extend along the cutting blade to completely cover the back of the lawn mower cutter reel.

The central portion of the mulcher is provided with one or more baffle ribs extending on either side of the center of the central portion. The end members are provided with a number of baffle ribs, the outer ribs extending at an angle with their top portion converging toward the center of the lawn mower cutter reel. When the baffle ribs are positioned in this manner over the rear portion of the cutter reel, they cause the cut grass to be moved toward the center of the lawn mower blade which insures moving the cut grass centrally of the mower even though the blade is a right or a left hand helical cutter. Therefore, with our lawn mulcher the dealer can offer the same to the public without having the technical knowledge to discern whether or not the customer's lawn mower is a right or left hand helical cutter.

Our invention includes the method of providing a lawn mower with a lawn mulcher which operates to direct the cut grass toward the center of the cutter blade, the movement of the blade causing the cut grass to be directed against the inner wall of the mulcher whereupon the baffle ribs of the mulcher direct the cut grass toward the center of the cutter blade and the operation of the mower carries the grass out centrally of the lawn mower and thereby prevents any piling of the cut grass on either side of the lawn mower. The mulching method is accomplished by the recutting of the grass as it is carried out in front of the blades, so that the grass is cut over and over until it is in such fine particles that it acts as a mulch when deposited on the ground. With our method, the lawn does not have a series of windrows on either side of the lawn mower. No rack or grass catcher is required for the lawn mower.

These features, together with other details and objects of our invention, are clearly defined and set forth throughout the specifications and claims.

In the drawings forming a part of this specification:

Figure 1 illustrates a sectional side elevation of a hand-powered lawn mower showing our lawn mulcher attached thereto.

Figure 2 is an exploded perspective view looking toward the inside of our lawn mulcher.

Figure 3 is a perspective view looking toward the inside of our lawn mulcher when the end members are attached to the central portion.

Figure 4 is a side end view of our lawn mulcher.

Figure 5:
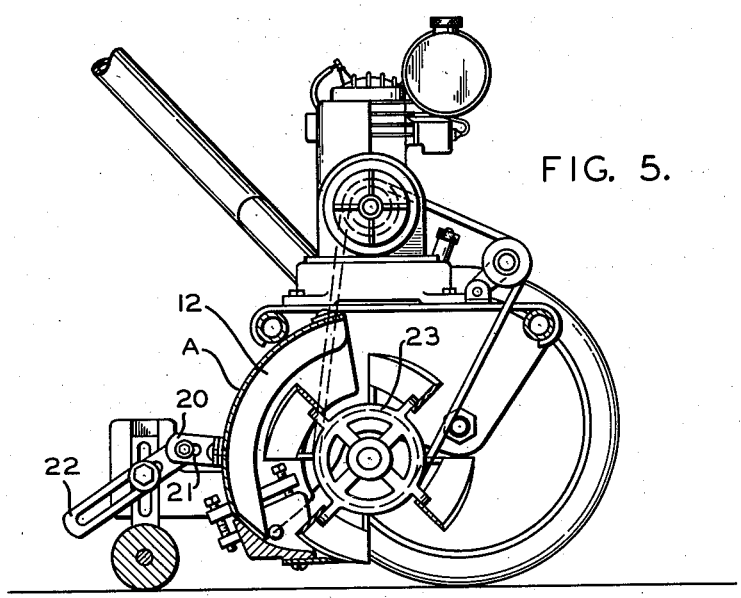

Figure 5 is a section of a power driven lawn mower showing our lawn mulcher attached thereto and illustrating the form in which the mulcher may be made with a shorter upper front end owing to the fact that the power driven mower operates with such force and rapidity that the cut grass is carried around to the front of the cutting blades without requiring the extended front upper edge on the lawn mulcher.

Figure 6:
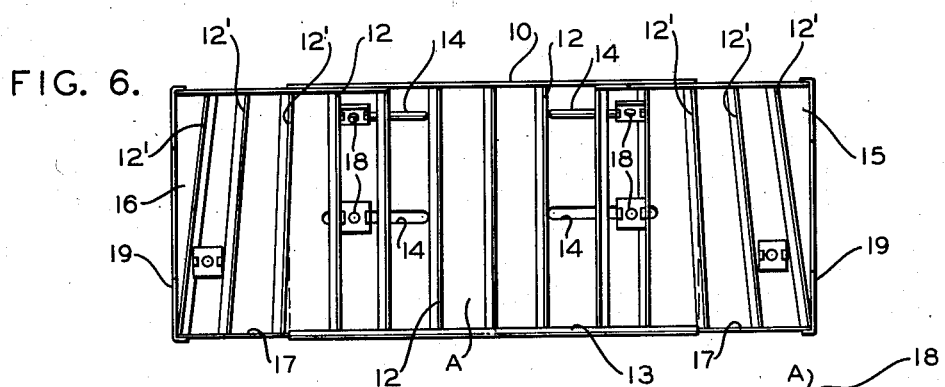

Figure 6 is a straight front view looking into our lawn mulcher when the ends are attached to the central portion.

Figure 7:
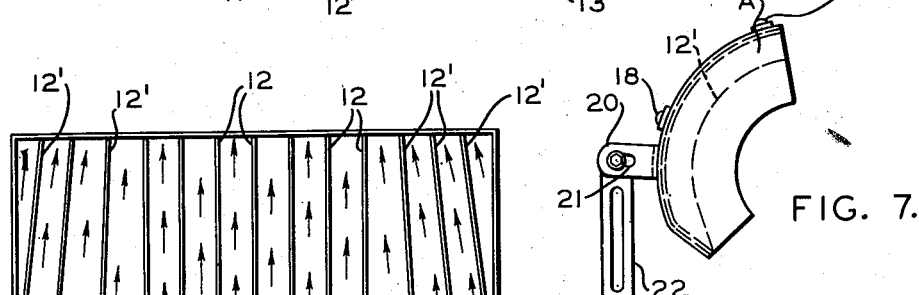

Figure 7 illustrates a side end view of the short front lip used on power lawn mowers.

Figure 8:
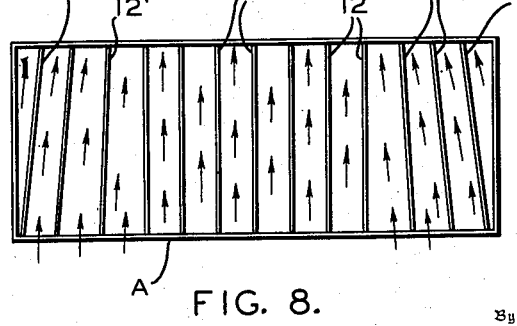

Figure 8 illustrates a diagram of the position of the baffle ribs in our present form of lawn mulcher to indicate the flow of the grass directed by the positioning of the baffle ribs to direct the grass at the ends of the mulcher toward the center portion thereof, while the central portion of the mulcher acts to carry the grass perpendicularly around the back of the cutter reel and over in front of the same.

Our lawn mulcher A is composed of an arcuated central section 10 having a relatively flat longitudinal portion 11. Secured to the inner surface of the central section 10 are baffle ribs 12 which are perpendicular to the bottom edge of the central section 10. An inturned flange 13 is formed on the leading edge of the flat portion 11. Slots 14 are formed in the body of the central section 10 for purposes of adjustment hereinafter described.

We also provide end sections 15 and 16, the arcuated portions of which are formed identical with the central section 10. Both of said end portions are adapted to slide within the central section 10 for longitudinal adjustment of the length of the complete mulcher which is comprised of the three sections. The end sections 15 and 16 have baffle ribs or vanes 12 secured therein, the vanes 12' nearest the ends of the end sections being disposed at an angle so that the top portion of the baffles slant toward the center of the cutting reel of the mower. The vanes 12 secured to the inner end of the end sections are relatively perpendicular to the flat portion 11' formed on the bottom of the end sections. The end sections 15 and 16 are formed with a lower longitudinal lip 17 which is adapted to slide within the inturned flange 13 formed on the central section 10 so that the end sections 15 and 16 fit within the central section for adjustment and support, thereby constituting a mulcher which may be adjusted to fit various size lawn mowers.

The bolts 18 are secured to the end portions 15 and 16 and positioned in the slots 14. The bolts move in the slots 14 so that the end sections are adjustable within the central section 10. The end sections 15 and 16 are provided with arcuated end plates 19. The end sections are also provided with right-angular brackets 20 which have a slot 21 formed therein for adjusting the slotted bracket 22 which is adapted to be adjustably positioned on a portion of a lawn mower.

We have found that as a result of increased speed of the cutting reel of a lawn mower, as in a power mower, directing the grass at greater velocity against the inside of the lawn mulcher, a shorter arc in the sections of the mulcher is needed, as illustrated in Figure 5, and Figure 7. In other words, the greater the speed of the grass traveling onto and through the mulcher, the smaller the arcuated portion of the mulcher need be to direct the grass over the cutting reel of the mower and onto the ground in front of the mower.

In the operation of a lawn mower, the grass tends to be deposited in windrows on either side of the path cut by the mower, depending upon the cutting reel having left or right twist to the helical blades thereof. Where a left hand helical cutting blade reel is employed on a mower, the grass cut thereby tends to be driven toward one side or the other of the mower. To counteract this flow of grass, the vanes or baffles are formed at an angle on the outer inside portion of the end sections 19 to direct the grass toward the center of the cutting reel which would normally flow over and past the end of the cutting reel. Where a left hand helical cutting blade reel is employed, the angled baffles 12' on the right hand section facing the front of the mulcher are effective. The opposite is true where a right hand cutting reel is employed, the angled baffles 12' on one end being sufficient to counteract the flow of grass toward the outer wheel of the lawn mower and directed toward the center of the reel and mulcher for depositing the same in front of the cutting reel. If the baffles 12' were angled toward the center of the mulcher on only one end, then a left and right hand mulcher would have to be constructed. With our invention, having counteracting baffles in each of the end sections, a single mulcher may be used on mowers having left or right hand helical cutting reels.

In Figure 8 we have a diagrammatic showing of how the grass, indicated by the arrows, is directed toward the center of the mulcher by means of the baffles 12' formed within the end sections of the mulcher.

In operation, the flat portions 11 and 11' are positioned adjacent the lower cutting bar of the lawn mower so that the mulcher extends upwardly and over the cutting blade reel 23. The brackets 20 and 22 are then adjustably secured in position so that the mulcher is placed close to and over a portion of the cutting reel 23. As the mower, with the mulcher attached thereto, is pushed over the grass, the cutting blade tends to throw the grass to one side or the other, depending upon whether or not it is a left or right hand helical cutter. The vanes 12', in one end section or the other, straighten out the flow of grass, depending upon whether the cutting reel 23 is a right or left hand helical cutting reel.

We claim:

1. A lawn mulcher for lawn mowers including a central portion having a series of perpendicular baffle ribs extending from the bottom to the top thereof, adjustable end portions adapted to be secured to said central portion, each of said portions having an arcuated formation which is adapted to conform with the cylindrical formation of the cutter reel and thereby forming a guard from the cutter knives of the lawn mower around the back of the cutter reel and over the top thereof to direct cut grass in front of the cutter reel.

2. A sectional adjustable lawn mulcher including a central portion having a series of perpendicular baffle ribs therein, end portions having a series of inclined baffle ribs with the top of the ribs directed toward the center of said central portion to direct cut grass from the cutter blade of the lawn mower toward the center of the cutter reel to cause the cut grass to be re-cut until it is fine enough to be deposited in front of the cutter as a mulch on the ground, and means for adjustably connecting said sections together.

3. A lawn mulcher including a series of sections adapted to act as guards over the back portion of the cutter reel of the lawn mower, baffle ribs formed on the inside of each of said sections adapted to direct the cut grass toward the center of the cutter reel of the lawn mower, means for securing said sections adjustably together to permit said sections to be adjusted to the length of the cutter blade of the mower, and end plates on said end sections to direct the cut grass toward said baffle ribs and thereby direct cut grass from either end of the cutter reel toward the center of the cutter blade of the mower.

4. A sectional lawn mulcher including a central section portion, end sections, means for adjustably fixing said sections together, and a series of baffle ribs formed on the inside of said sections adapted to direct all of the cut grass from the lawn mower cutter blade toward the central portion of the lawn mower cutter blade and thereby direct the cut grass centrally of the lawn mower and overcome end windrows along either side of the lawn mower.

5. A sectional lawn mower mulcher comprising a central portion, end sections adjustably secured to said central section, a guiding inner flange for receiving the lower edge of said end sections formed on said central section, perpendicular baffle guide ribs formed along the inner surface of said central section, and centrally inclined guide ribs formed on said end sections adapted to direct cut grass toward said center section and over the cutter reel of the lawn mower to cause re-cutting of the grass until it is fine enough to be deposited as a mulch on the lawn, said end sections having wide end plates which fit close to the hub of the cutter reel of the lawn mower, and means for adjustably fixing said mulcher to the back portion of the mower with the front of the lawn mulcher open to discharge the cut grass out the top of the front of said mulcher.

6. A lawn mulcher composed of adjustable arcuated sections, means for adjustably connecting said sections together to permit adjustment of the overall length of said mulcher, means for connecting said sections to a lawn mower, grass-directing vanes on the inner surface of said sections, the vanes on the end sections directing the cut grass toward the center and front of the mower in the path of the cutter blade thereof and the vanes on the central section directing the cut grass forwardly of the cutter means of the mower.

7. A device for attachment to a lawn mower of the character described including a central arcuated section, arcuated end sections adapted to slide and be adjustably positioned within said central section, means within said end sections to direct cut grass towards the center of said device, means in said center section for directing cut grass forward and over the cutting reel of a lawn mower and means for attaching said device to a lawn mower.

8. A hood for directing grass cut by a mower comprising a central section, end sections adjustably connected to said central section, means within said end sections to direct cut grass towards said central section, means in said central section for directing cut grass forward and over the cutting reel of a lawn mower and means for adjustably attaching said device to a lawn mower in a manner to cause grass cut by the lawn mower to be carried out in front of the lawn mower where the same is recut.

HAROLD K. ELLIOTT.
THELLAR J. JOHNSTON.

REFERENCES CITED

The following references are of record in the file of this patent:

UNITED STATES PATENTS

| Number | Name | Date |
|---|---|---|
| 2,066,174 | Cregier | Dec. 29, 1936 |
| 2,162,783 | Moyer | June 20, 1939 |